United States Patent [19]

Gorodissky et al.

[11] 4,148,493
[45] Apr. 10, 1979

[54] SEALING DEVICE FOR HIGH PRESSURE APPARATUS

[75] Inventors: Leonid G. Gorodissky, Moscow, U.S.S.R.; Nikolai T. Romanov, deceased, late of Moscow, U.S.S.R., by Anastasia I. Romanova, administrator

[73] Assignee: Vsesojuzny Nauchno-Issledovatelsky I Experimentalny Istitut po Pererabotke Khinicheskikh Volokon, U.S.S.R.

[21] Appl. No.: 896,573

[22] Filed: Apr. 14, 1978

[51] Int. Cl.² .......................... B08B 3/00; F26B 25/00; F16J 15/54
[52] U.S. Cl. ................................ 277/12; 277/237 R; 277/DIG. 7; 68/5 E; 34/23; 34/242
[58] Field of Search ................... 277/12, 22, 72 R, 74, 277/102, 75, 237 R, DIG. 7; 68/5 R, 5 B, 5 E; 34/23, 242

[56] References Cited

U.S. PATENT DOCUMENTS

| 3,048,992 | 8/1962 | Nakaguchi | 68/5 E |
| 3,320,676 | 5/1967 | Speers | 34/23 |
| 3,919,783 | 11/1975 | Cirrito | 34/23 |

FOREIGN PATENT DOCUMENTS

| 1000967 | 8/1965 | United Kingdom | 34/242 |
| 1055040 | 1/1967 | United Kingdom | 68/5 E |

Primary Examiner—Robert S. Ward, Jr.
Attorney, Agent, or Firm—Steinberg & Blake

[57] ABSTRACT

A sealing device for high pressure apparatus designed for the treatment of fabric comprises a housing with two openings for inlet and outlet of the fabric, with two rolls contacting each other accommodated therein and adapted to rotate in the opposite direction for transporting the fabric being treated. Provided inside the housing are also two spaced apart bars arranged parallel to the rolls, each of the bars carrying a sealing member each of which contacts its respective roll. The bar ends made as trunnions rest upon bearings in the opposite walls of the housing and the overhung extensions of these trunnions protruding beyond the housing carry a suspension means for each of said two rolls, the suspension means being adjustable for length. The overhung extensions of the trunnions also carry a means for rocking motion of the sealing members relative to the axes of the bars. Such a construction of the sealing device ensures accurate adjustment of the sealing members with respect to the rolls.

3 Claims, 6 Drawing Figures

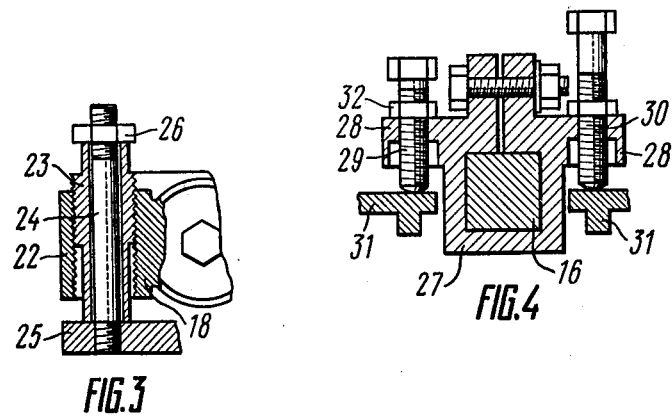
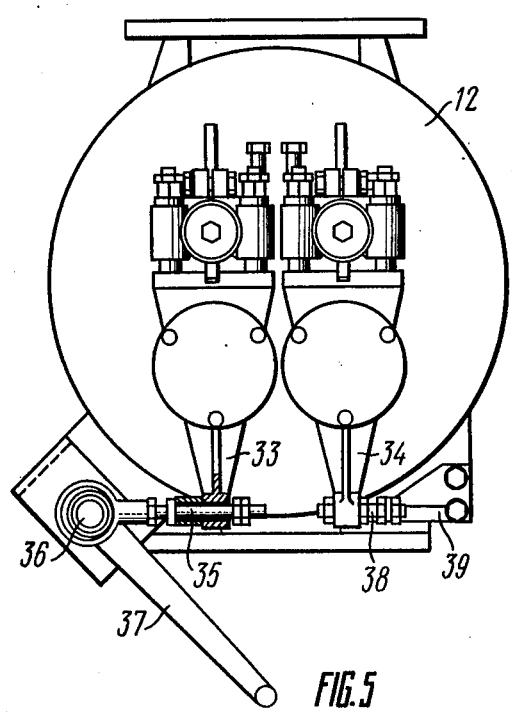

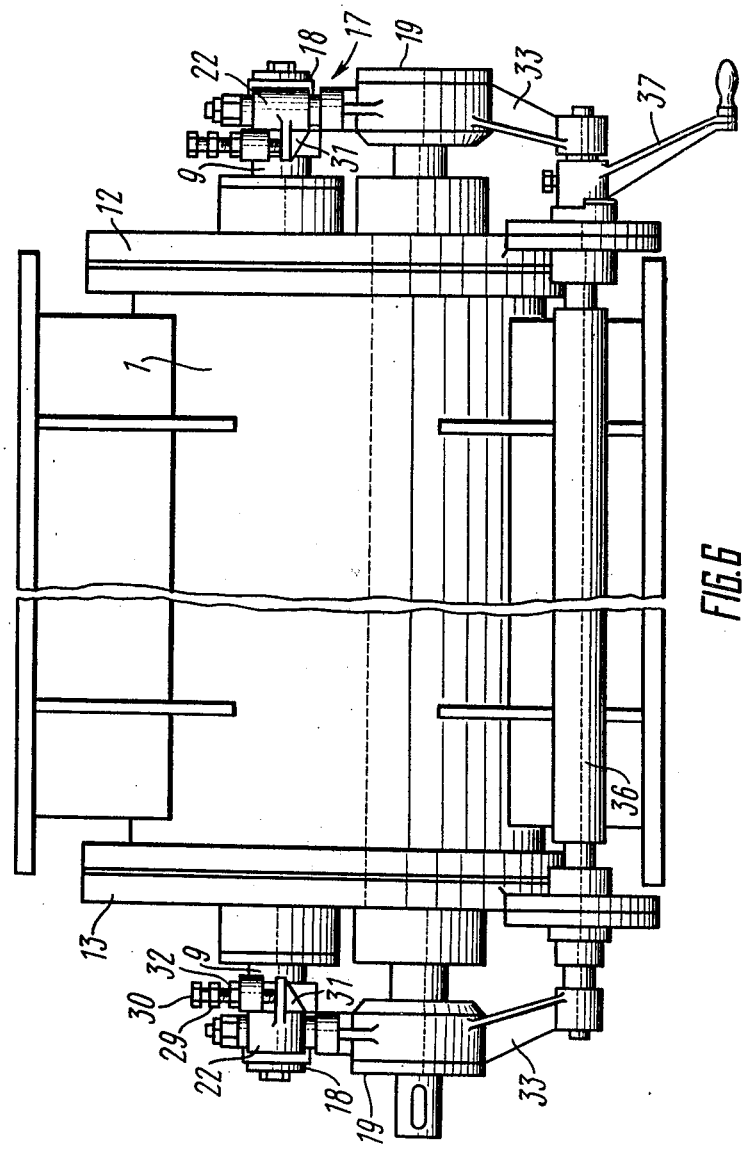

SEALING DEVICE FOR HIGH PRESSURE APPARATUS

The present invention relates to high pressure apparatus and, more particularly, to sealing devices ensuring sealing of apparatus.

The present invention can most advantageously be used in apparatus for treating fabric under pressure.

The treatment of fabric under pressure involves the use of high pressure apparatus incorporating a pressure chamber having the inlet and outlet for the fabric being treated, the chamber being provided with two seals mounted at the inlet and outlet of the fabric, respectively. In the housing of each of these seals mounted are two rolls covered with elastic material and adapted to rotate in opposite directions for transporting the fabric, and sealing members enclosing the rolls and ensuring gas-tight sealing of the seal housing.

However, the seals of such apparatus have the drawback that the rolls for transporting the fabric, and the sealing members which are in close contact with them, in the absence of an adequate adjustment of their mutual positions, are subject to considerable wear while in operation, which results in a lower quality of the fabric treated.

The prior art knows an improved sealing device in which the above-mentioned drawback has been to some extent eliminated (cf., e.g., U.S. Pat. No. 3,320,676). In the housing of that sealing device there are installed two rolls covered with elastic material and rotatable in opposite directions for transporting the fabric. Each of the rolls is enclosed in a sealing member mounted on a detachable bracket, the sealing members being adapted to move together with the rolls in the direction perpendicular to the movement of the fabric. Such a construction enables one to adjust the relative positions of the roll and its respective sealing member only when assembling the sealing device and replacing the rolls by varying the number of gaskets placed between the halves of the brackets. Such an arrangement, however, fails to ensure high accuracy of adjustment for the mutual positions of the working surface of a sealing member and the surface of a roll, the arrangement enabling both surfaces to be moved with respect to each other only in one direction, namely, in the radial one. Such a movement alone is not enough to achieve the optimum mutual orientation for these two surfaces.

The apparatus of the same type in the prior art, due to the impossibility of achieving the optimum mutual arrangement of the work surface of the sealing member and the roll surface, required a long wear-in for these surfaces, which results in excessive original wear of the roll surface and in an inferior quality of the surface thereof.

The high accuracy required for the adjustment of these arises from the necessity of compensating thermal deformation of the rolls in operation. The setting of the most acceptable mutual position of the surface of a roll and that of the respective sealing member in the apparatus of the prior art is usually done by a trial-and-error method involving the use of a feeder in order to set a certain clearance between these surfaces, the clearance being eliminated during thermal expansion. This kind of trial-and-error technique requires a large number of operations to select the preliminary clearance, which is time consuming because every operation of this kind involves dismantling of the roll fastening member.

In addition, the arrangements in the prior art fail to provide for the possibility of correcting an already completed adjustment of the mutual position of the rolls and packing members in an apparatus in operation.

It is an object of the present invention to increase the accuracy for the adjustment of the mutual position of the sealing member and the roll surface for transporting the fabric by ensuring the sealing member and the roll to move more freely when adjusting.

Another object of the present invention is to provide for the possibility of correcting the adjustment on a running apparatus.

These and other objects are attained by providing a sealing device comprising a couple of rolls being in contact with each other and mounted in the housing of the sealing device, and adapted to rotate in opposite directions for transporting of fabric, two spaced bars mounted parallel to the rolls journalled in bearings, a roll suspension means mounted on the bars to ensure contact between the rolls and sealing members mounted on the bars, wherein, according to the invention, the suspension means for the rolls incorporates a device ensuring rocking motion of the sealing members relative to the axes of the bars and a device for radial movement of the rolls relative to the respective sealing members.

Such a construction of the suspension means for rolls enables one to ensure free movement of the operational surface of the sealing members with respect to the roll surfaces not only radially but also in directions provided by the possibility of rocking the rolls relative to the axes of the bars supporting the sealing members. In addition, the design of the device ensuring rocking motion of the sealing member enables one to adjust the mutual disposition of the working surfaces of the sealing members and of the respective rolls on a running apparatus.

It is advisable that the device providing for the possibility of rocking motion of the rolls with respect to the axes of the bars supporting the sealing members be made in the form of a yoke secured on the overhung extension of the bar. Adjusting screws turned into the yoke lugs enable one to carry out smooth rocking motion of the rolls relative to the respective bars, the operation making it possible to change the orientation of the working surface of the sealing members relative to the surfaces of the respective rolls.

The invention will be better understood from the following description taken in conjunction with the accompanying drawings, wherein:

FIG. 3 is a longitudinal section of a screw joint of the mechanism for radial displacement of the rolls;

FIG. 4 is a cross-sectional view of a mechanism for rocking motion of sealing members;

FIG. 5 is a front view of a sealing device for a high pressure apparatus, and

FIG. 6 is a side view of a sealing device for a high pressure apparatus.

Figure 2:
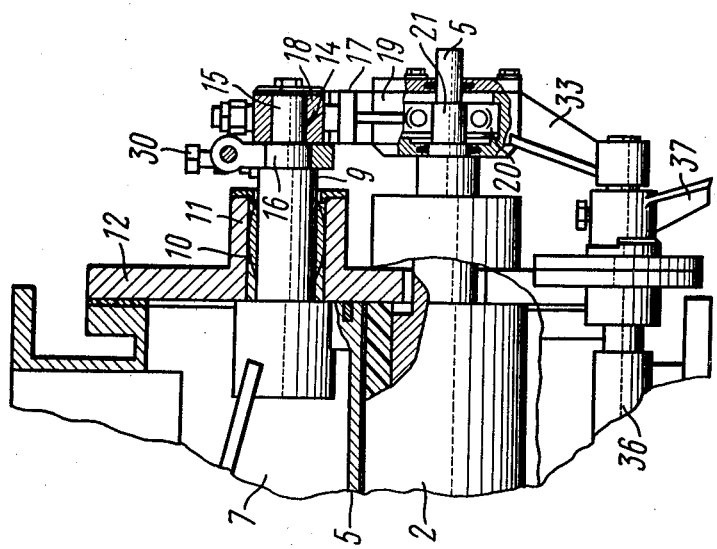
FIG. 2 is a longitudinal section of a roll suspension means.
Figure 1:
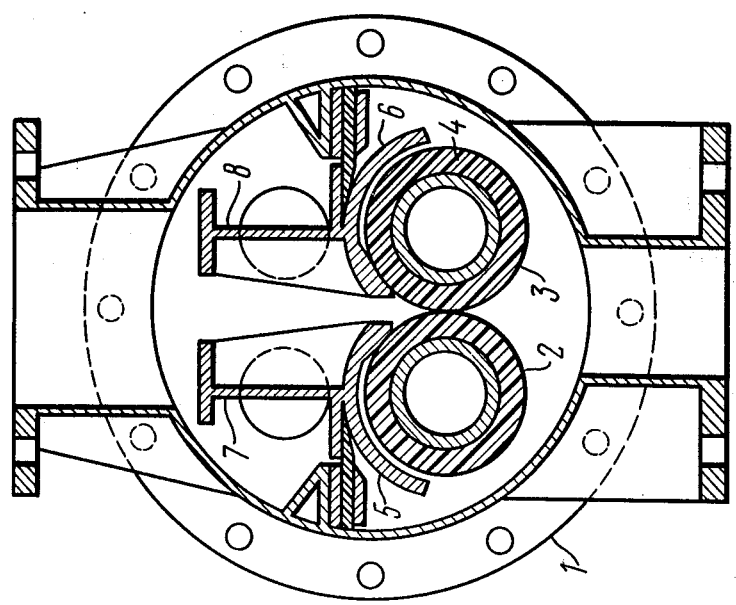
FIG. 1 is a croos-sectional view of the sealing device for a high pressure apparatus.

The sealing device comprises a housing 1 (FIG. 1) incorporating a pair of rolls 2 and 3 covered with an elastic heat-resistant material 4 and adapted to transfer the material being treated. The rolls 2 and 3 have, along the generatrix, a contact with sealing members 5 and 6 secured, respectively, on bars 7 and 8 disposed above the rolls 2 and 3 inside the housing 1. The bars 7 and 8 whose ends are made in the form of trunnions 9 (FIG. 2)

rest upon bearings 10 mounted in lugs 11 on covers 12 and 13 of the housing 1. The trunnions 9 have overhung extensions 14 consisting of a cylindrical portion 15 and a rectangular member 16. The cylindrical portions 15 of the overhung extensions 14 carry a suspension mechanism 17 for the rolls 2 and 3, comprising sleeves 18 fitted freely on the cylindrical portion 15, and housings 19 for bearings 20, accommodating the trunnions 21 of the rolls 2 and 3, running from the covers 12 and 13.

The trunnions 21 of the rolls 2 and 3 are provided, at the outlet of covers 12 and 13 of the housing 1, with packing means of the conventional type. The sleeves 18 have lugs 22 (FIG. 3) provided with threaded holes for threaded sleeves 23 screwed therein and incorporating pins 24 passed therethrough and screwed with their first ends into the lugs 25 of the housing 19, while their second ends are provided with nuts 26 screwed thereon. Each of the rectangular members 16 of the overhung extensions 14 carries yokes 27 (FIG. 4) having lugs 28 with adjusting screws 29 and 30 turned into the threaded holes thereof. The sleeves 18 are further provided with lugs 31 on which the adjusting screws 29, 30 rest with their first ends, the second ends of the screws 29, 30 being provided with retaining nuts 32 screwed thereon.

The housings 19 for the bearings 20 are provided with levers 33, 34 (FIG. 5). The levers 33 have openings with adjusting links 35 secured therein and coupled with an eccentric shaft 36 having a handle 27. Each of the levers 34 has an opening for studs 38 to fit with one of their ends, the other end of said studs being secured by means of a bracket 39 to the covers 12 and 13.

As it has been mentioned above, the sealing devices are installed at the inlet and outlet of the pressure chamber (not shown) of the apparatus for treatment of fabric. The rolls 2 and 3 rotating in opposite directions transfer the fabric and, being pressed against each other due to the excess pressure, ensure against leakage of working medium from the pressure chamber.

The adjustment of the position of rolls and sealing members being done during the initial assembling and each successive maintenance is carried out as follows.

The supporting means of one of the rolls, for instance, of the roll 3, comprising the bearings 20 installed in the housings 19 are stationary fixed at both ends of the housing 1 adjacent the covers 12 and 13 by way of securing the levers 34 on said covers 12 and 13 by means of the brackets 39 and the pins 38. By screwing the pins 38 into or out of the bracket 39 adjustment is done of the roll 3 so as to make it take the position parallel to the movement of fabric. The roll 2 should move freely with respect to the fixed roll 3. This is achieved by connecting the levers 33 to links 35 adjustable for length and mounted on the eccentric shaft 36. The length of the links 35 is selected so that their extreme displacement in one direction caused by turning of the eccentric shaft 36 ensures touching of surfaces of the rolls 2 and 3, whereas their extreme displacement in the opposite direction ensures a clearance between the rolls 2 and 3 sufficient for the fabric to enter the apparatus. Turning of the eccentric shaft 36 is done via the handle 37. The mutual position of the rolls 2 and 3 and of the respective sealing members 5 and 6 in contact with them can be adjusted by two kinds of displacement. The first kind, viz., translatory movement, is brought about by radially displacing the rolls 2 and 3 relative to the respective sealing members 5 and 6. The second kind, namely, rocking motion, is effected by rocking the sealing members 5 and 6 with respect to the axial line of their trunnions 9. The radial displacement of the rolls 2 and 3 with respect to the sealing members 5 and 6 is done by screwing the threaded sleeves 23 into or out of the threaded holes in the lugs 22 of the respective sleeves 18. The position selected is fixed by means of the nuts 26.

The rocking motion of the sealing members 5 and 6 relative to their respective rolls 2 and 3 is brought about by the adjusting screws 29 and 30 of the yokes 27 supported at their ends by the lugs 31 of the sleeve 18. For this purpose, one of the adjusting screws, e.g., screw 29, is turned out by the required amount, upon which the opposite screw 30 is turned in by the same amount, the yoke 27 rigidly mounted on the rectangular member 16 of the overhung extension 14 causing the turning of the respective bars 7 and 8 along with the respective sealing members 5 and 6 installed thereon. This rocking motion helps not only to adjust the mutual position of the surfaces of the rolls and of the sealing members during the initial assembling and the successive repair work, but also to correct the adjustment on a running apparatus.

The two kinds of displacement, viz., radial and tangential, effected irrespective of each other on either of the two suspension mechanisms 17 located at the opposite covers 12 and 13 of the housing 1 of the sealing device enable one to accurately select the necessary mutual position of the surfaces of the sealing members and of those of the respective rolls. Furthermore, such an independent suspension makes it possible to counteract the effects of possible cocking of working surfaces of the sealing members 5 and 6 caused by manufacturing imperfections of these parts.

What is claimed is:

1. A sealing device for a high pressure apparatus designed for treatment of fabric and comprising:
    a housing with two openings for inlet and outlet of fabric;
    two rolls being in contact with each other, accommodated inside said housing and adapted to rotate in opposite directions for transporting the fabric being treated;
    two spaced apart parallel bars accommodated inside said housing and arranged parallel to said rolls;
    said two bars having their ends made as trunnions mounted in bearings in the opposite walls of said housing;
    said trunnions having overhung extensions protruding beyond said housing;
    two sealing members, each of them being secured on said respective bar inside said housing;
    a roll suspension means used to suspend said rolls from said overhung extensions;
    a means for radial displacement of said rolls with respect to said corresponding bars;
    means for rocking motion of said sealing members with respect to the axes of said bars.

2. A sealing device as claimed in claim 1, wherein said means for rocking motion of said sealing members is made as yokes having adjusting screws and secured on said respective overhung extensions.

3. A sealing device for a high pressure apparatus, as claimed in claim 1, wherein said suspension means are made as detachable screw joints mounted freely on said respective.

* * * * *